United States Patent [19]

Lipschutz

[11] 4,258,352

[45] Mar. 24, 1981

[54] CONTROL DEVICE FOR VEHICLE LOCKS

[75] Inventor: Paul Lipschutz, Croissy, France

[73] Assignee: Neiman, S.A., Courbevoie, France

[21] Appl. No.: 15,387

[22] Filed: Feb. 26, 1979

[30] Foreign Application Priority Data

Mar. 17, 1978 [FR] France ............................... 78 07726

[51] Int. Cl.[3] ............................................... B60Q 1/00

[52] U.S. Cl. ....................................... 340/53; 340/531

[58] Field of Search ..................... 340/53, 63, 64, 539, 340/531; 343/225, 228

[56] References Cited

U.S. PATENT DOCUMENTS

| | | | |
|---|---|---|---|
| 3,225,265 | 12/1965 | Krause et al. | 343/225 |
| 3,760,422 | 9/1973 | Zimmer et al. | 343/225 |
| 3,906,348 | 9/1975 | Willmott | 343/225 |

*Primary Examiner*—Alvin H. Waring

*Attorney, Agent, or Firm*—James Creighton Wray

[57] ABSTRACT

A device is provided for controlling the electromechanical locking and unlocking member of a vehicle door lock and comprises a transmitter independent of the said vehicle and a receiver mounted inside the vehicle. The transmitter comprises a direct current electric supply source, a coded pulse signal generator drivable by said supply source, and an infra-red radiation emitter connected to said coded signal generator whereby said radiation emitter outputs infra-red pulses in coded form. The receiver comprises detector means for the reception of the infra-red pulses, a memory programed to emit coded pulses identical to said coded pulses from the emitter. A comparator coupled to the outputs of said detector means and said memory, and arranged to emit a signal in the case of agreement between the transmitter and receiver pulses, and an amplifier connected to the output of said comparator. On application by the user of the correct transmitter in close proximity to the receiver, the coded pulses from the emitter pass to the detector means, whereby the output signals therefrom are compared with the output of the memory to provide an output signal from the comparator for actuating the locking member. The lock control device permits locking and unlocking by means of the transmitter which remains in the possession of the user, while the receiver is mounted within the vehicle, without any part of it being accessible to the exterior.

8 Claims, 2 Drawing Figures

CONTROL DEVICE FOR VEHICLE LOCKS

BACKGROUND TO THE INVENTION

The present invention concerns a control device for automobile vehicle locks. It applies more particularly to door locks, preferably but not exclusively for their simultaneous locking or unlocking.

PRIOR ART STATEMENT

The locks used at present on automobile vehicle doors comprise a device for locking and unlocking the lock, constituted in the case of the front doors by a cam controlled by a key-actuated lock cylinder which can likewise be coupled to a switch intended to feed electromagnets which will act upon the locks of the other doors. The security obtained by this type of control depends of course upon the quality of the cylinder lock, but in all cases it is still capable of being forced, with more or less large means, since a part of the cylinder must be accessible from the exterior of the vehicle. This accessibility also poses tricky mechanical problems, especially of water-tightness. Furthermore the increase of the number of combinations of cylinder locks, which in theory permits of increasing security, is burdensome.

It has also been proposed to utilize locking devices using mechanical means associated with other means, for example magnetic. All these solutions present the same drawbacks as those just described, and furthermore are infinitely more burdensome. Moreover in all mechanically based solutions the possibility of access to the control location is an important problem.

OBJECT OF THE INVENTION

The present invention aims at resolving the problems posed by known or proposed automobile locks, in a satisfactory and efficacious manner.

SUMMARY OF THE INVENTION

According to the invention there is provided a device for the control of an electro-mechanical locking and unlocking member of at least one lock of an automobile vehicle, comprising a transmitter independent of the said vehicle, said transmitter comprising a direct current electric supply source, a coded pulse signal generator drivable by said supply source, and an infra-red radiation emitter connected to said coded signal generator whereby said radiation emitter outputs infra-red pulses in coded form, and a receiver fast with the said vehicle, said receiver comprising detector means for the reception of the infra-red pulses, a memory programed to emit coded pulses identical to said coded pulses from the emitter, a comparator coupled to the outputs of said detector means and said memory, and arranged to emit a signal in the case of agreement between the transmitter and receiver pulses, and an amplifier connected to the output of said comparator, wherein on application by the user of the correct transmitter in close proximity to the receiver, the coded pulses from the emitter pass to the detector means, whereby the output signals therefrom are compared with the output of the memory to provide an output signal from the comparator for actuating the locking member.

Thus the device according to the invention permits a control by means of a transmitter which remains in the possession of the user, while the receiver is housed within the vehicle, without any part of it being accessible to the exterior.

BRIEF DESCRIPTION OF DRAWINGS

The invention will be clearly understood on reading of the following description given with reference to the accompanying drawing, wherein.

DESCRIPTION OF PREFERRED EMBODIMENT

In the examples of embodiment as described and in accordance with a preferred form of embodiment of the invention, the means for transmission and reception o, the coded message use infra-red radiation.

Figure 1:
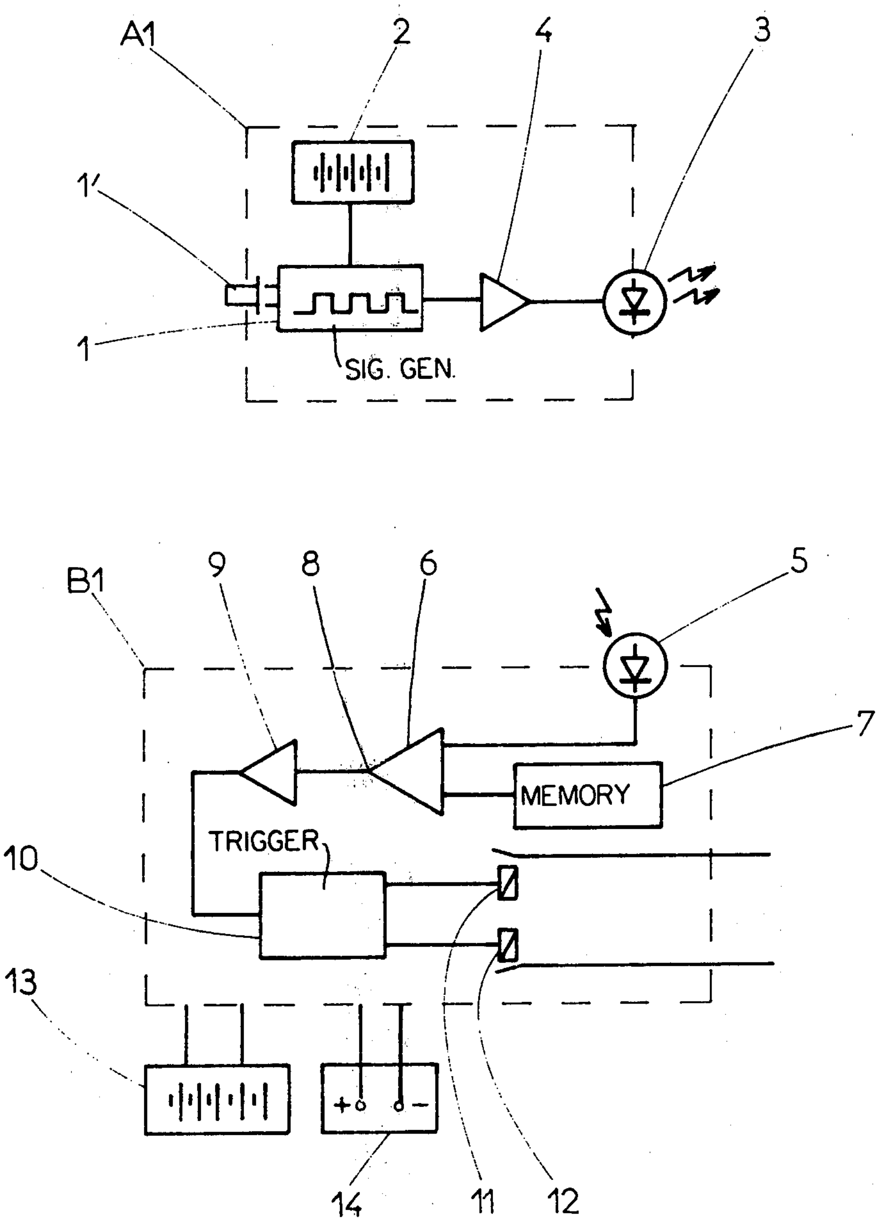
FIG. 1 is a block diagram of a device according to one example of embodiment of the invention and FIG. 2 is a block diagram of a variant.

The device as represented in FIG. 1 comprises a transmitter part A1 constituted by a coded message generator 1 fed by a battery 2 and connected to an emitter diode 3 through the intermediary of an amplifier 4. The whole is enclosed in a case.

In the vehicle there is mounted a receiver part B1 which comprises a photodiode 5 which receives the information and is connected to one input of a comparator 6, the other input of the comparator 6 being connected to a memory 7 containing a coded message compatible with the coded message produced by the generator. The output 8 of the comparator 6 emits a signal if, and only if, the coded message received by the photodiode 5 is identical with the message contained in the memory 7. This signal is amplified by an amplifier 9 the output of which acts upon a trigger circuit 10 which alternately controls two relays 11 and 12. The relay 11 controls the locking while the relay 12 controls the unlocking, these relays supplying the known devices for electric locking of door and/or trunk of the vehicle. Moreover a member for blocking the anti-theft device and the fuel tank filler flap-door of the vehicle can be controlled, so as to obtain supplementary security.

In the form of embodiment as described, the actuation of the coded transmitter A1, preferably by means of a push-button 1', produces locking and unlocking alternately. In order to avoid the possibility of the unlocking being incapable of being effected when the charge of the battery 2 is too weak, which would be dangerous when the driver has locked his vehicle from the inside, the invention provides that the intensity necessary for emission of the locking coded message is appreciably higher than that necessary to emit the unlocking message. In this way, when the battery 2 has reached a certain level of discharge, this is translated by the impossibility of actuating the relay 11.

The receiver part B is normally supplied by the battery 13 of the vehicle. Should the charge of this battery become insufficient, it would become impossible to actuate the control device. The invention provides the connection of the receiver part B to supply terminals 14 external to the vehicle, to which terminals an emergency battery can be fitted permitting of effecting the supply of the receiver part B in the case of failure of the battery 13, without actuating the control device. The photodiode 5 is advantageously placed in a region where it can easily be reached by the radiation of the emitter diode 3, for example behind the windscreen.

Figure 2:
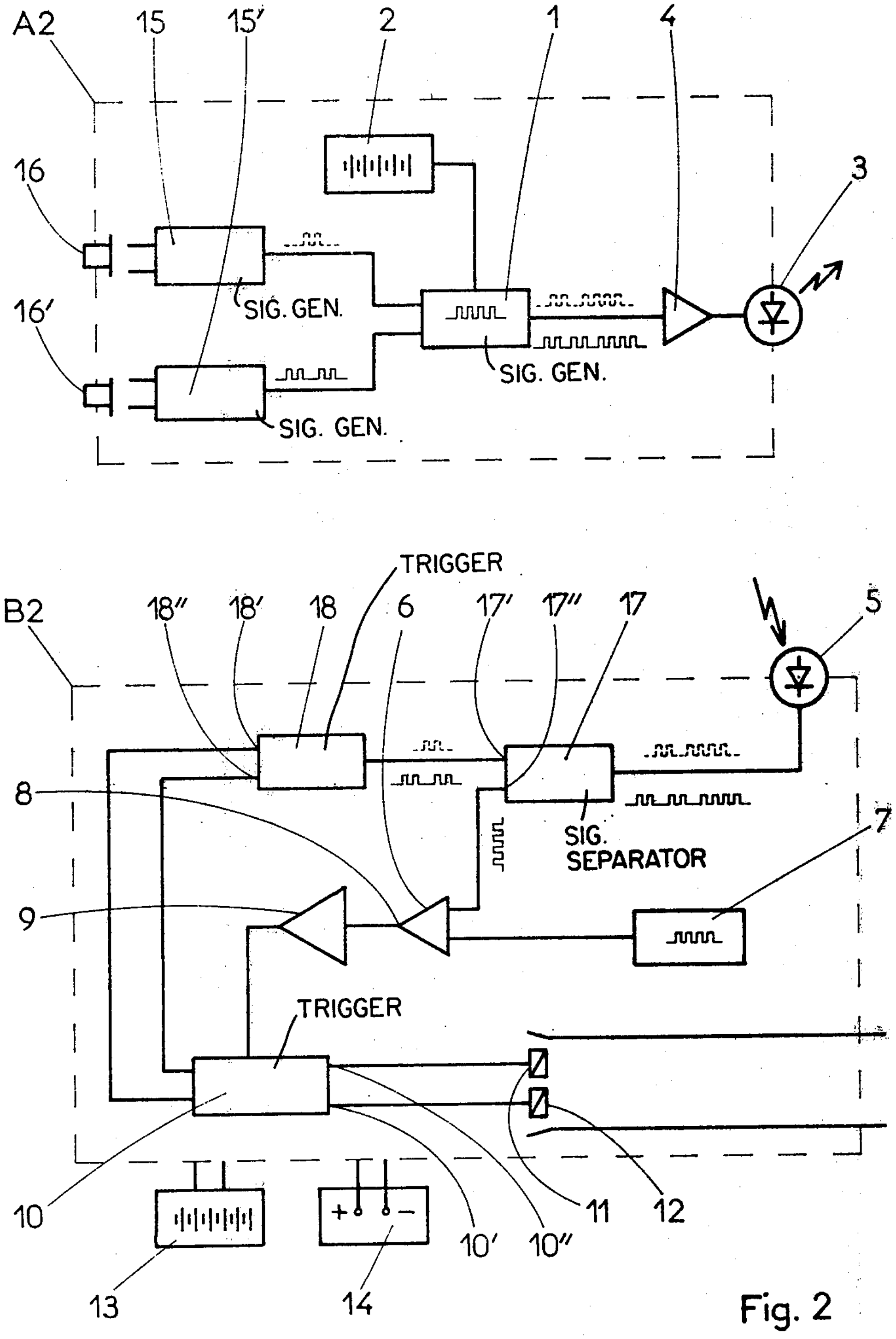

In a variant of embodiment which is represented in FIG. 2 the functions of locking and unlocking are no longer produced by successive actions upon one single push-button.

The transmitter part A2, in addition to the coded generator 1, comprises two trip signal generators 15 and 15' which are actuated by two push-buttons 16 and 16'. The signal generated by the generators 15 or 15' precedes the coded signal generated by the generator 1, and these signals are amplified by the amplifier 4 and emitted by the diode 3.

The receiver part B2 receives the complex signal from the photodiode 5; this signal is applied to the separator 17 which transmits the trip signal by its output 17' and the actual coded signal by its output 17". As previously, this coded signal is compared in the comparator 6 with the signal memorised in the memory 7, then amplified by the amplifier 9. In parallel, the trip signal controls a trigger circuit 18 which, according to the form of the received signal, supplies either the unlocking output 18' or the locking output 18", these signals controlling another trigger circuit 10 which sends the signal amplified by the amplifier 9 either to the unlocking relay 12 or to the locking relay 11.

I claim:

1. A device for the control of an electro -mechanical locking and unlocking member of at least one lock of an automobile vehicle, comprising:

(a) a transmitter independent of the said vehicle, said transmitter comprising:

(1) a direct current electric supply source, (2) a coded pulse signal generator drivable by said supply source, (3) and an infra-red radiation emitter connected to said coded signal generator whereby said radiation emitter outputs infra-red pulses in coded form; and (b) a receiver fast with the said vehicle, said receiver comprising:

(1) detector means for the reception of the infra-red pulses, (2) a memory programed to emit coded pulses identical to said coded pulses from the emitter, (3) a comparator coupled to the outputs of said detector means and said memory, and arranged to emit a signal in the case of agreement between the transmitter and receiver pulses, and (4) an amplifier connected to the output of said comparator, wherein on application by the user of the correct transmitter in close proximity to the receiver, the coded pulses from the emitter pass to the detector means whereby the output signals therefrom are compared with the output of the memory to provide an output signal from the comparator for actuating the locking member.

2. A device according to claim 1, wherein the said transmitter comprises an emitter diode and the said reception means comprise a photodiode.

3. A device according to claim 1, wherein the said receiver is supplied by the battery of the vehicle.

4. A device according to claim 3, wherein the said receiver comprises a terminal for connection to a source external to the vehicle.

5. A device according to claim 1, wherein the said amplified signal is applied to a bistable device which controls at least one pair of relays.

6. A device according to claim 5, wherein the intensity necessary to generate the locking signal is higher than that necessary to generate the unlocking signal.

7. A device according to claim 2, wherein the said photodiode is lodged behind the windscreen of the vehicle.

8. A device according to claim 1, wherein the coded signal is preceded by a trip signal.

* * * * *